United States Patent [19]

Kiyomiya et al.

[11] 4,138,368
[45] Feb. 6, 1979

[54] CATALYST FOR REDUCING NITROGEN OXIDES

[75] Inventors: Makoto Kiyomiya; Misao Kawai, both of Kawaguchi, Japan

[73] Assignee: Director General of Agency of Industrial Science and Technology, Tokyo, Japan

[21] Appl. No.: 803,651

[22] Filed: Jun. 6, 1977

[30] Foreign Application Priority Data

Jun. 12, 1976 [JP] Japan .................................. 51-69219

[51] Int. Cl.² ......................... B01J 23/34; B01J 23/72; B01J 23/86
[52] U.S. Cl. .................................. 252/470; 252/471; 252/472; 252/474; 423/239
[58] Field of Search ............... 252/470, 472, 471, 474; 423/213.5, 239

[56] References Cited

U.S. PATENT DOCUMENTS

| 3,767,764 | 10/1973 | Dolbeak | 423/213.5 |
| 3,945,947 | 3/1976 | Sakai et al. | 252/466 B |
| 4,003,976 | 1/1977 | Komatsu et al. | 423/213.5 |

FOREIGN PATENT DOCUMENTS 51-54072  5/1976  Japan ...................................... 423/239

Primary Examiner—W. J. Shine

[57] ABSTRACT

A catalyst for reducing nitrogen oxides is prepared by shaping into granules a naturally produced inorganic powdery substance composed predominantly of $\alpha$-$Fe_2O_3$ alone or in mixture with one or more of metals selected from Groups I-b, V-a, VI-a, VII-a and VIII of the periodic Table or compounds thereof, and thereafter subjecting the granules to a heat treatment. This catalyst can be used for reductively eliminating dilute nitrogen oxides in exhaust gas by bringing the exhaust gas and a reducing agent into contact with the catalyst.

6 Claims, No Drawings

CATALYST FOR REDUCING NITROGEN OXIDES

BACKGROUND OF THE INVENTION

The present invention relates to a catalyst for reducing nitrogen oxides and to a method of reductively eliminating dilute nitrogen oxides in exhaust gas wherein the catalyst is used together with a reducing agent. More particularly, the present invention relates to a catalyst for reducing nitrogen oxides which is derived from a naturally produced $\alpha\text{-}Fe_2O_3$-containing mineral alone or in mixture with one or more of specific kinds of metals or compounds thereof as well as a method of reductively eliminating dilute nitrogen oxides in exhaust gas wherein the exhaust gas is brought together with ammonia as reducing agent into contact with the catalyst.

Exhaust gas burnt and discharged from various fixed combustion units contains harmful ingredients such as sulfur oxides, nitrogen oxides and the like. The nitrogen oxides are regarded as substances causing environmental pollution, especially photochemical smog as a new type air pollution. In view of preventing air pollution which now becomes a big social problem, therefore, it is highly desired to inhibit discharge of nitrogen oxides from combustion units.

At present, various processes for inhibiting discharge of nitrogen oxides or various denitration processes are proposed as techniques for reducing the amount of nitrogen oxides discharged. Among these processes, a selectively catalytic reduction process wherein nitrogen oxides in exhaust gas are reacted with ammonia in the presence of a catalyst or composite catalyst composed of an oxide of iron, vanadium, chromium, copper or cerium or a catalyst comprising such metal oxide supported on a carrier such as γ-alumina or titanium oxide, thereby reductively converting the nitrogen oxides into harmless water and nitrogen is considered to be most effective.

As the temperature of exhaust gas from a fixed combustion unit such as a boiler is usually kept at 100–150° C., however, a denitrating equipment must be operated under such condition that various factors such as the amounts and concentrations of reactants which have significant influence on the chemical reaction rate cannot be kept constant. Thus, the catalyst utilizable for this purpose requires such performances as high rate of eliminating nitrogen oxides within a wide range of temperatures especially at lower temperatures and catalytic activity hardly reducible in the coexistence of sulfur dioxide, water carbon dioxide, oxygen or dust contained in exhaust gas. In addition, the catalyst must be nontoxic and less expensive and free of such defect that the active ingredient is easily detached from the carrier. On practical use of the catalyst, most of the above requirements should be satisfied. Actually, however, a conventional catalyst for reducing nitrogen oxides in which an oxide catalyst such as iron oxide has to be supported on a carrier such as γ-alumina or titanium oxide cannot economically be prepared. When such catalyst is used for a reducing treatment of nitrogen oxides in exhaust gas for a long period of time under the above mentioned high temperature conditions, γ-alumina, titanium oxide and the like oxide are easily attacked or poisoned by sulfur oxides and water also contained in the exhaust gas, thus resulting in shortening of the bed life of the catalyst. Thus, there is a great demand for developing a new type catalyst for this purpose, which possesses stable high catalytic activity for a prolonged period of time and satisfactory mechanical strength.

BRIEF SUMMARY OF THE INVENTION

It is an object of the present invention to provide a catalyst for reducing nitrogen oxides which is satisfactory in catalytic activity over a wide range of temperatures and in mechanical strength.

It is another object of the present invention to provide a catalyst for reducing nitrogen oxides which is derived from a naturally produced inorganic substance composed predominantly of $\alpha\text{-}Fe_2O_3$.

It is still another object of the present invention to provide a catalyst for reducing nitrogen oxides which is derived from the naturally produced inorganic substance incorporated with a specific metal or a compound thereof.

It is further object of the present invention to provide a method of reductively eliminating nitrogen oxides in exhaust gas which comprises bringing the exhaust gas together with ammonia into contact with the catalyst.

Briefly stated the invention provides a catalyst for reducing nitrogen oxides which comprises granules of a naturally produced inorganic substance composed predominantly of $\alpha\text{-}Fe_2O_3$ (typically ochre) with an iron content of 50–85% by weight, which granules have been subjected to a heat treatment at 350–800° C. and may contain from 0.01 to 30 parts by weight (per 100 parts of the naturally produced substance) of selected compounds of Cu, V, Mn, Cr, Fe, Ni or Co.

Other objects, features and advantages of the present invention will become apparent more fully from the following description.

DETAILED DESCRIPTION OF THE INVENTION

As a result of extensive researches made to develop a new type catalyst for reducing nitrogen oxides which satisfies the above mentioned various requirements, it has now been found surprisingly that a naturally produced inorganic substance composed predominantly of $\alpha\text{-}Fe_2O_3$ represented, for example, by ochre is particularly suitable as a starting material for such catalyst. A naturally produced inorganic substance composed predominantly of $\alpha\text{-}Fe_2O_3$ such as ochre can be shaped into granules possessing satisfactory strength and high reducing activity to nitrogen oxides. The present invention is based on the above finding.

In accordance with an embodiment of the present invention, there is provided a catalyst for reducing nitrogen oxides which has been prepared by shaping powders of a naturally produced inorganic substance composed predominantly of $\alpha\text{-}Fe_2O_3$ into granules and subjecting the granules to a heat treatment in the air.

Examples of the naturally produced inorganic substance composed predominantly of $\alpha\text{-}Fe_2O_3$ include ochre and hematite. The use of ochre is preferred. Although the content of $\alpha\text{-}Fe_2O_3$ in the naturally produced inorganic substance varies according to the sort thereof but it is generally necessary that the content of $\alpha\text{-}Fe_2O_3$ is 50–85% by weight, preferably 60–80% by weight. In a representative example, the chemical composition of a typical ochre is shown below.

Table 1

| Components | Content (% by weight) |
|---|---|
| $Fe_2O_3$ | 71 ~ 72 |

Table 1-continued

| Components | Content (% by weight) |
| --- | --- |
| $SiO_2$ | 5 ~ 7 |
| $Al_2O_3$ | 0.3 ~ 0.9 |
| CaO | 0.1 ~ 0.8 |
| $Na_2O$ | 0.3 |
| $SO_3$ | 0.2 ~ 0.6 |
| $P_2O_5$ | 0.4 ~ 0.5 |
| Combined water | 12 ~ 13 |

The catalyst is prepared, for example, in the following manner: The above mentioned inorganic substance, for example, ochre usually in the form of powder or lump is pulverized directly and dried so that the moisture content of the inorganic substance may be within the range of 15 ~ 35% by weight, preferably 25 ~ 30% by weight. If necessary, the inorganic substance may be washed with a 0.1 ~ 1N sulfuric acid solution prior to pulverization. The pulverized inorganic substance is incorporated, if necessary, with an organic or inorganic binder, then kneaded thoroughly and finally shaped into granules by extrusion molding or tumbling granulation of the kneaded mass. After shaping into granules, the substance is dried and then subjected to a heat treatment whereby baking of the substance is attained. The inorganic or organic binder may be any of the known conventional ones including clay, silicates, starch, tar and the like. Such binder is incorporated only for the purpose of improving shaping characteristics of the substance. Thus, there is no necessity of adding such binder if the substance possesses sufficient shaping characteristics for the method of granulation used. No special technique is necessary for granulation of the inorganic substance and granulation itself can be effected according to a usual method. The drying and baking treatment of the granules can also be carried out in a manner known per se. For example, drying of the granules is effected at a temperature of 50–150° C., while baking of the granules is effected in the air at a temperature within the range of 350–800° C., preferably 400–500° C.

In accordance with another embodiment of the present invention, there is provided a catalyst for reducing nitrogen oxides which has been prepared by incorporating powders of a naturally produced inorganic substance composed predominantly of $\alpha$-$Fe_2O_3$ with one or more of metals selected from the Groups I-b, V-a, VI-a, VII-a and VIII of the Periodic Table or compounds thereof, shaping the mixture into granules and then subjecting the granules to a heat treatment in the air.

It has now been found that the catalytic activity for reducing nitrogen oxides of the catalyst can be improved by incorporating the inorganic substance composed predominantly of $\alpha$-$Fe_2O_3$ with a small amount of one or more metals selected from the Groups I-b, V-a, VI-a, VII-a and VIII of the Periodic Table or compounds thereof. Preferable examples of the metals to be incorporated into the inorganic substance include copper as a metal belonging to Group I-b, vanadium as a metal belonging to Group V-a, chromium as a metal belonging to Group VI-a, manganese as a metal belonging to Group VII-a and iron, nickel and cobalt as metals belonging to Group VIII of the Periodic Table. In addition to the above metals per se, oxides, hydroxides, nitrates, formates, sulfates or chlorides may also be used. The amount of these metals or compounds thereof to be incorporated into the inorganic substance is generally within the range of 0.01–30 parts by weight per 100 parts by weight of the inorganic substance. The powdery inorganic substance incorporated with one or more of these metals or compounds thereof is optionally mixed with an inorganic or organic binder and a small amount of water, thoroughly mixed and then shaped into granules. The inorganic or organic binders of the above mentioned type may also be used in this case. Granulation of the mixture is carried out in the same manner as described above, using an extrusion molding and tumbling granulation technique. For example, the mixture may be treated first with a pelleter capable of shaping the mixture into a pillar form or with a conventional extrusion molding machine and then with an appropriate tumbling granulation device to shape the roughly molded pieces into a granular (or spherical) form. The after-treatment of the granules, i.e. drying and baking of the granules can be carried out in the same manner as described above. The size of the granules is within the range of 0.5–10 mm, preferably 1–5 mm.

Hitherto, the prior art catalysts for reducing nitrogen oxides are composed of a catalytically active metal or metal compound baked and supported on a carrier. In contrast, the catalyst of the present invention is distinguished by the use of a specific inorganic substance which functions as both catalytically active ingredient and carrier. The catalyst of the present invention possesses satisfactory mechanical strength in addition to the high catalytic activity for reduction of nitrogen oxides so that the catalyst can be used in a reactor for a long period of time without fear of any degradation or disintegration. Further, the catalyst of the present invention can exhibit high catalytic activity on reduction of nitrogen oxides over a wide range of temperatures, in particular, at lower temperatures. The high catalytic activity is kept for a long period of time and is not repressed by coexistent sulfur oxides, water, oxygen, carbon oxides, oxygen and the like gases.

In accordance with still another embodiment of the present invention, there is provided a method of reductively eliminating nitrogen oxides in exhaust gas which comprises bringing a mixture of exhaust gas containing dilute nitrogen oxides and a small amount of ammonia as reducing agent into contact with a catalyst prepared by shaping into granules a naturally produced inorganic substance composed predominantly of $\alpha$-$Fe_2O_3$ alone or in mixture with one or more of metals selected from Groups I-b, V-a, VI-a, VII-a and VIII of the Periodic Table or compounds thereof, and thereafter subjecting the granules to a heat treatment.

On reductive elimination of dilute nitrogen oxides ($NO_x$) contained in exhaust gas from a combustion unit such as boiler by the aid of the catalyst of this invention, it has been found that addition of ammonia as reducing agent in an amount greater than the stoichiometrical amount needed for reductively decomposing nitrogen oxides to nitrogen and water to exhaust gas prior to the treatment serves to make it possible to reduce the nitrogen oxides selectively without being adversely affected by water, sulfur oxides (such as $SO_2$ and $SO_3$), carbon monoxide and dioxide, oxygen and the like coexistent in the exhaust gas. In this case, it is necessary to maintain the catalyst at a definite temperature. The temperature adopted for reductive elimination of nitrogen oxides is usually maintained within the range of 200–500° C., preferably 250–400° C. The space velocity of a mixture of exhaust gas and ammonia passed through the catalyst bed is generally within the range of 1000–20,000 $hr^{-1}$, preferably 4000–16,000 $hr^{-1}$. The amount of ammonia added as reducing agent to exhaust gas prior to the reducing treatment is generally 1.2–2.0 times as much as the theoretical amount needed to convert nitrogen oxides into nitrogen and water.

According to the method of the present invention, nitrogen oxides alone can be reduced selectively under the above mentioned conditions. It has been found that the reducing reaction is promoted by oxygen coexistent in exhaust gas but is hardly affected by sulfur dioxide. The rate of reduction is little changed even in the presence of about 1000 ppm of sulfur dioxide.

It is remarkable advantage of the present invention that the catalyst having high catalytic activity for a long period of time can be prepared easily without using any carrier as in the prior arts and that the catalyst is not adversely affected by water, sulfur dioxide, oxygen and the like coexistent gases in exhaust gas and is capable of reductively eliminating nitrogen oxides with high selectively even at a relatively low temperature. As the catalyst of the present invention can be obtained by merely granulation followed by baking of an inorganic substance composed predominantly of $\alpha$-$Fe_2O_3$ such as ochre naturally produced in a very large amount, the cost required for preparing the catalyst is extremely low.

The present invention will now be illustrated in more detail by way of examples.

EXAMPLE 1

A mixture of a naturally produced ochre powder having a composition shown in Table 1 and 25–30% by weight of water was kneaded, molded by extrusion and finally subjected to tumbling granulation. The resulting granules were dried at 100° C. in the air whereby a catalyst capable of reductively decomposing nitrogen oxides was obtained.

EXAMPLE 2

A reactor of 25 mm in inner diameter was charged with a part of the catalyst prepared in Example 1 up to an apparent catalyst volume of 12 ml. A synthetic sample gas having the following composition, which was similar in composition to exhaust gas from boilers was passed through the reactor at a space velocity of 5000 $hr^{-1}$ whereby the temperature of the catalyst bed and the reduction rate of nitrogen oxides were measured.

Composition of the synthetic sample gas

| NO | 450 ppm | $O_2$ | 4% |
|---|---|---|---|
| $NH_3$ | 600 ppm | $H_2O$ | 10% |
| $SO_2$ | 150 ppm | $N_2$ | balance |

A result of the experiment is shown in Table 2.

Table 2

| Reaction temperature | Reduction rate of NO (%) |
|---|---|
| 300° C | 74.0 |
| 330° C | 82.3 |
| 360° C | 88.2 |
| 390° C | 91.0 |
| 420° C | 87.4 |

EXAMPLE 3

A mixture of a naturally produced ochre powder having a composition shown in Table 1 and 20–30% by weight of an aqueous solution of cupric nitrate (An organic or inorganic binder may also be added, if necessary.) was kneaded, molded by extrusion and finally subjected to tumbling granulation. The resultant granules were dried at 100° C. and then heated at 500° C. in the air whereby a catalyst capable of reductively eliminating nitrogen oxides was prepared.

In a similar manner, several kinds of catalyst were also prepared by using an aqueous solution of ammonium metavanadate, chromic acid, manganese nitrate, ferric nitrate, cobalt nitrate, nickel nitrate or cupric sulfate in place of the above mentioned aqueous solution of cupric nitrate.

EXAMPLES 4–12

A reactor of 25 mm in inner diameter was charged with a part of each catalyst prepared in Example 3 up to an apparent catalyst volume of 12 ml. A synthetic sample gas having the following composition, which was similar in composition to exhaust gas from boilers was fed to the catalyst bed at a space velocity of 5000 $hr^{-1}$ whereby the temperature of the catalyst bed and the reduction rate of nitrogen oxides were measured.

Composition of the synthetic sample gas

| NO | 450 ppm | $H_2O$ | 11% |
|---|---|---|---|
| $NH_3$ | 600 ppm | $SO_2$ | 240 ppm |
| $O_2$ | 4% | $N_2$ | balance |

Representative results of the experiments are shown in Table 3 below.

Table 3

| | Type of the catalyst | | | |
|---|---|---|---|---|
| Example No. | Metal compound added | Amount added (%) | Reaction temperature (° C) | Reduction rate of nitrogen oxides (%) |
| 4 | $V_2O_5$ | 2.73 | 180 | 81.6 |
| | | | 220 | 94.0 |
| | | | 260 | 99.0 |
| | | | 340 | 99.6 |
| | | | 380 | 97.2 |
| | | | 420 | 80.8 |
| 5 | $Cr_2O_3$ | 2.81 | 200 | 89.5 |
| | | | 260 | 98.8 |
| | | | 340 | 99.2 |
| | | | 380 | 89.5 |
| | | | 420 | 59.2 |
| 6 | $MnO_2$ | 2.94 | 260 | 79.0 |
| | | | 300 | 87.5 |
| | | | 340 | 95.0 |
| | | | 380 | 84.3 |
| 7 | $Fe_2O_3$ | 3.01 | 300 | 74.6 |
| | | | 340 | 91.2 |
| | | | 380 | 93.3 |
| | | | 420 | 43.5 |
| 8 | $Co_3O_4$ | 2.73 | 380 | 27.2 |
| 9 | NiO | 3.15 | 300 | 75.3 |
| | | | 340 | 90.2 |
| | | | 380 | 88.4 |
| | | | 420 | 53.3 |
| 10 | CuO | 3.39 | 240 | 84.5 |
| | | | 300 | 97.0 |
| | | | 340 | 92.8 |
| | | | 360 | 66.4 |
| 11 | $CuSO_4$ | 5.08 | 260 | 44.3 |
| | | | 300 | 81.6 |
| | | | 340 | 91.8 |
| | | | 380 | 60.2 |
| 12 | $CuSO_4$ | 8.05 | 260 | 54.4 |
| | | | 300 | 83.2 |
| | | | 340 | 92.2 |
| | | | 380 | 70.3 |

It is understood that the preceding representative examples may be varied within the scope of the present specification, both as to ingredients and reaction conditions, by one skilled in the art to achieve essentially the same results.

As many widely different embodiments of this invention may be made without departing from the spirit and scope thereof, it is to be understood that this invention is not limited to the specific embodiments thereof except as defined in the appended claims.

What is claimed is:

1. A catalyst for reducing nitrogen oxides which comprises a mixture of granules of
   (A) a naturally produced inorganic substance composed predominantly of $\alpha$-$Fe_2O_3$ admixed with
   (B) one or more compounds of metals selected from the group consisting of Cu, Cr, Co, Fe, Mn and Ni, said compound being selected from the group consisting of oxides, hydroxides, nitrates, sulfates, formates and chlorides in amounts of from 0.01 to 30 parts by weight per 100 parts of (A), which mixture of granules has been subjected to a heat treatment in the range of 350–800° C.

2. A catalyst according to claim 1 wherein said heat treatment is carried out at a temperature within the range of 400–500° C.

3. A catalyst according to claim 1 wherein the $\alpha$-$Fe_2O_3$ content of said naturally produced inorganic substance is within the range of 50–85% by weight.

4. A catalyst according to claim 1 wherein said naturally produced inorganic substance is ochre.

5. A catalyst according to claim 1 wherein the amount of said compound thereof is within the range of 0.01–30 parts by weight per 100 parts by weight of said inorganic substance.

6. A catalyst according to claim 1, wherein the component (B) of said mixture is a compound selected from CuO, $V_2O_5$, $Cr_2O_3$, $MnO_2$ $CuSO_4$, and $Fe_2O_3$.

* * * * *